United States Patent [19]

Fletcher et al.

[11] 4,039,489

[45] Aug. 2, 1977

[54] OIL AND FAT ABSORBING POLYMERS

[76] Inventors: James C. Fletcher, Administrator of the National Aeronautics and Space Administration, with respect to an invention of; Harold E. Marsh, Jr., La Canada, Calif.

[21] Appl. No.: 674,700

[22] Filed: Apr. 7, 1976

Related U.S. Application Data

[63] Continuation-in-part of Ser. No. 228,229, Feb. 22, 1972, abandoned.

[51] Int. Cl.² ................................................ C08G 18/82
[52] U.S. Cl. ........................... 260/2.5 AD; 210/40; 210/DIG. 27; 260/2.5 AM; 260/2.5 AY; 260/77.5 AP
[58] Field of Search ............... 260/2.5 AD, 2.5 AY, 260/77.5 AP, 2.5 AM; 210/40, DIG. 21

[56] References Cited

U.S. PATENT DOCUMENTS

| | | | |
|---|---|---|---|
| 3,674,743 | 7/1972 | Verdol | 105/135 |
| 3,714,110 | 1/1973 | Verdol | 16/111 |
| 3,953,406 | 4/1976 | Marsh | 260/2.5 AD |

OTHER PUBLICATIONS

Smith, "Diisocyanate-Linked Polymers, II Mechanical and Swelling Properties of Some Polyurethane Elast." Journal Poly. Sci., vol. 42, pp. 391–414 (1960).

*Primary Examiner*—C. Warren Ivy
*Attorney, Agent, or Firm*—Monte F. Mott; Wilfred Grifka; John R. Manning

[57] ABSTRACT

A polymer system and resulting method useful for absorbing fats or oils which comprises forming a solid, network polymer having a minimal amount of cross-linking. The polymer that remains solid at a swelling ratio in oil or fat of at least ten and thus provides an oil absorption greater than 900 weight percent.

15 Claims, No Drawings

OIL AND FAT ABSORBING POLYMERS

ORIGIN OF THE INVENTION

The invention described herein was made in the performance of work under a NASA contract and is subject to the provisions of Section 305 of the National Aeronautics and Space Act of 1958, public Law 83-568 (72 Stat. 435; 42 USC 2457).

CROSS-REFERENCE TO RELATED APPLICATION

This application is a continuation-in-part of Ser. No. 228,229 filed Feb. 22, 1972, now abandoned.

BACKGROUND OF THE INVENTION

1. Field of the Invention

The present invention relates to novel lightly cross-linked, network polymeric systems and method of forming and using same to absorb oils.

2. Description of the Prior Art

There has recently been great concern with improving oil absorbing materials, especially the oil spill off the coast of Santa Barbara, Calif. and other areas where oil has presented a problem with regard to water pollution. One clean-up approach has involved the utilization of polyurethane foams to absorb the oil from the surface of water. Another method involves absorbing oil with a mixture of oleophilic shredded rubber tires and particulate polystyrene scraps as disclosed in U.S. Pat. No. 3,567,660. The resulting absorbate is then converted to an asphalt-like material. Apparently, the liquid oil coalesces around the sorbent rubber particles to form large coherent agglomerates. Another approach, disclosed in U.S. Pat. No. 3,314,903, relates to absorbing oil by forming an in situ oil extended polyurethane foam. The oil is mixed together with a liquid polyol, an aromatic diisocyanate, an emulsifier, a catalyst and a blowing agent. The resulting mixture foams and incorporates the oil into the polyurethane foam.

In all of the prior art methods heretofore disclosed, the oil absorbing products such as the foamed material or the shredded tires and polystyrene, for example, have limited oil absorption capabilities. In other words, the utilization of polymers for adsorption or absorption was particularly dependent upon the available material and the polymers were not specially formulated for this purpose. Prior polyurethane foams have structural integrity and strength and therefore there must be sufficient cross-linking of the polyol material to form a fairly rigid solid. Thus, prior art foams were highly cross-linked in the belief that such was required. However, it has been found here for many oil absorbing situations, the polymer need not have any sufficient strength and thus a minimum of cross-linking would be sufficient. The polymer, even when it has little structural strength can still provide: (1) a high surface to thickness ratio so as to maximize the absorption surface available, and (2) an enhancement of absorption capacity achieved by the further presence of the holes in the foam. In view of the above discussion, it can be seen that though polymer systems were used to absorb oil, none of the prior art techniques provided for an extremely high absorbency of oil per unit of polymeric material utilized.

SUMMARY OF THE INVENTION

High oil absorbing polymers are provided in accordance with the invention by the formulation of cross-linked polymeric networks having an unusually low amount of cross-linking. Cross-linking is kept to a minimal level to obtain a network system among polymeric chains. The absorption capacity of the polymers of this invention is increased by an optional extraction/drying step to completely remove all solvent material used in the polymerization and all of the soluble polymeric material which did not unite into the network. The polymers of this invention can best be defined in terms of their resulting ability to absorb a solvent or oil. The swelling ratio of the solid network polymer to the oil should be at least ten or better. That is, it must have a 900% absorption. In order to achieve the foregoing, it is believed that the mean chain length of the polymer between cross-linking sites should be at least 4,000 chain atoms. Another way of indicating the minimal cross-linking is that it must be sufficient only to obtain a solid product even when swelled. Thus, the lowest permissible degree of cross-linking is at the point at which a solid polymer results. The invention can thus be applied to virtually any cross-linked polymer system wherein the cross-linking is susceptible of control. Where the resulting weakly cross-linked polymer of this invention is to be utilized in applications where strength is required, upon absorption of oil, the polymer may be disposed on suitable substrates which serve to provide a backbone of strength or structural strength for the absorbed oil and polymer system.

DESCRIPTION OF THE PREFERRED EMBODIMENTS

It should be readily apparent that the herein invention can apply to an extremely wide variety cross-linked polymer systems. The process of formulating the polymer generally consists of two steps-synthesis and extraction/drying. The second step of extraction/drying is optional; however, the oil absorption capacity of the polymer system is substantially improved when this step is utilized. Another reason for extraction/drying may at times be to remove all non-network material so that it cannot be released into the system from which oil is being absorbed.

The synthesis step, discussed above, can be either (1) polymerization, starting with monomers, which produces chain extension and cross-linking simultaneously, (2) simultaneous cross-linking and chain extension of systems using functional prepolymers (so-called liquid rubbers), or (3) cross-linking only of high molecular weight polymers.

Preferred systems are formed by thermosetting condensation of functional prepolymers, especially elastomeric prepolymers with difunctional curing agents and at least trifunctional cross-linking agents. The several polyfunctional ingredients are mixed together usually in the presence of a catalyst and heated to form long block polymers lightly cross-linked by the cross-linking agent to form a swellable network. The oil is able to penetrate and swell the network. The amount of oil absorbed is that amount that enters the polymer structure. Of course, increased absorption could be provided by forming porous foams. The data presented below relates to swelling in terms of solid polymer particles absorbing oil and not oil entrained in pores.

The chief distinguishing structural feature of the class of polymers known as thermosetting is that the component polymeric molecules are tied together in a three-dimensional network. The average length of polymer chain between cross-linking (interconnecting) sites, together with the flexibility/stiffness character of the chain material, determines the mechanical properties of the polymer. Regardless of chain flexibility, highly cross-linked polymers are rigid. On the other hand, polymers with long chains between cross-links are rubbery, providing those chains are flexible. Another characteristic of the latter type of polymer is its ability to absorb extremely large quantities of compatible solvent and yet remain solid.

The prepolymer can have a molecular weight up to 100,000 or more. However, since such prepolymers are fairly viscous, they are more difficult to homogeneously disperse and cross-link. Liquid prepolymers having molecular weights from 1,000 to 6,000 and preferably 2,000 to 3,000 are most effective in the synthesis of this invention.

Representative elastomeric prepolymers are polymers or copolymers of $C_2$ to $C_8$ monounsaturated aliphatic hydrocarbon monomers such as polyethylene, polypropylene, polybutylene, ethylene-propylene, of $C_4$ to $C_8$ dienes such as polybutadiene, polyisoprene, polypentadiene, polyhexadiene, or hydrogenated dervatives thereof. Preferred hydrocarbon prepolymers are the hydrogenated or unhydrogenated liquid polymeric butadienes which are readily available with functional termination such as hydroxyl or carboxyl suitably those having from about 1.7 to 2.5 hydroxy groups per prepolymer molecule.

Other suitable elastomeric prepolymers are hydroxyl terminated polyalkylene oxide polymers having a molecular weight from 1,000 to 6,000 such as polyethylene oxide, or polypropylene oxide.

The prepolymers can be joined into a network by known cross-linking mechanisms such as radiation, free radical cure or condensation curing. Condensation cure is preferred since the amount of cross-linking can readily be controlled by the type and amount of cross-linking agent.

Suitable functional group pairs are hydroxyl-carboxyl (ester), epoxy-carboxyl (ester), amino-carboxyl (amide), aminoisocyanate (urea) and hydroxyl-isocyanate (urethane. Due to the stability of the urethane group and the ready availability of hydroxyl terminated prepolymers the urethane group is the linkage of choice in forming the network polymers of the invention.

The polymerization mixture must contain some trifunctional cross-linking agent but may also contain a difunctional curing agent and may also contain a monofunctional modifier to control cross-linking and chain extension. A catalyst may also be present to accelerate polymerization.

In the case of a urethane cure, the curing agent can be a diisocyanate such as toluene diisocyanate (TDI), dimer acid diisocyanate, hexamethylene diisocyanate and 4,4'-methylene di-o-tolydiisocyanate. The curing agents may also be of prepolymer length, suitably 1,000 to 3,000 molecular weight. Such materials are readily synthesized by prereacting a portion of hydroxy-terminated butadiene with a diisocyanate such as TDI. A suitable triol cross-linking agent is trimethylol propane (TMP), 1,2,6-hexane triol, glycerol. The triol may also be a prepolymer such as a saturated or unsaturated hydroxyl terminated butadiene prepolymer having a functionality from about 2.8 to 3.5. Any known urethane catalyst can be used such as ferric acetyl acetonate or stannous octoate. The ratio of NCO to total OH can be any ratio between gelling range of the polymerization composition but preferably is present in less than stoichiometric amount the preferred range is between about 0.5 to about 0.85.

In order to particularly understand the invention, attention is directed to the broad class of polyurethane type reactions. In this system, the prepolymers are difunctionally terminated and can, for example, include hydroxyl terminated polypropylene oxide, which is a polyether, hydroxyl terminated polybutadiene, which is an unsaturated hydrocarbon material, and hydrogenated hydroxyl terminated polybutadiene which is a saturated hydrocarbon material and the like. It should be pointed out that the type of reactive group, such as a hydroxyl or carboxyl type group on the prepolymer will often determine the type of curing system utilized. The aforegoing prepolymers having hydroxyl groups will react with isocyanate to form polyurethanes. In some other types of cures, the same prepolymers could be terminated with carboxyl groups and achieve the urea type cure reaction with isocyanate and produce a blowing agent, $CO_2$, at the same time to achieve a foam.

In order to achieve a cross-linking with the type of prepolymers utilized in a urethane type cure, a polyol having at least three hydroxyl groups can be utilized. In some cases, polyols are polyfunctional prepolymers as illustrated by polybutadiene and polypropylene oxide. Additionally, polyamines will act as cross-linking agents if care is particularly taken to control their reactivity and catalytic effects as is well known. A polyisocyanate can also provide cross-linking. An example of such a polyisocyanate is polymethylene polyphenylisocyanate. Various isocyanate curing agents can be utilized in the polyurethane type cures.

For example, where a prepolymer, and a polyol cross-linking agent is utilized, a difunctional isocyanate such as toluene diisocyanate, TDI, can be used. Additional possible diisocyanates would include, dimer acid diisocyanate, hexamethylene diisocyanate, and 4,4'-methylene di-o-tolylisocyanate, are contemplated. The utilization of polyphenylene polymethylene polyisocyanate is possible either by itself as indicated above, or in the presence of a polyfunctional curing alcohol cross-linking agent.

Any known urethane catalyst can be utilized to promote the reaction. Such materials include ferric acetyl acetone, stannous octoate and the like. Most any urethane cure can even be achieved without any catalyst. The catalyst, however, as is well known, assures a more rapid cure.

As indicated, the main objective of the herein invention is to get definitive yet as little as practical cross-linking to occur in the polymer network formed. In the condensation curing system, such as the polyurethane one, several different approaches can be utilized to accomplish the minimal cross-linking desired. Depending upon the approach utilized, a product having somewhat different characteristics will result.

In order to reduce the cross-linking concentration, one can reduce the concentration of the cross-linking agent. Additionally, one may shift the stoichiometry from near 1:1 of the differing reactive groups present to an excess of one or the other of the reactive groups. For example, in a system of a diol, a triol and a dicarboxylic acid, one can have an excess of either the OH groups in the mixed diol and triol or an excess of COOH groups in the acid above that stoichiometrally required to achieve complete cross-linking.

An additional approach to limiting the cross-linking is through the addition of a monofunctional ingredient such as 1-decanol which serves to terminate branching chains instead of allowing them to join other chains to intensify cross-linking.

It should be pointed out that one cannot readily determine beforehand with precision the amount of ingredients required to achieve the minimal cross-linking by using any of the above approaches indicated particularly for condensation type reactions. Rather, the processes involve simple trial and error experimentation within the framework of any of the above approaches to determine the conditions whereby minimal cross-linking is achieved and a maximum of oil absorption by the formed polymer is obtained. The following specific examples will give an indication of specific formulated polymer systems that can be formulated within the concept of the invention and are merely illustrative of the approach that can be taken within the broad spectrum of possibilities that exist within the polymeric art to achieve the herein results.

The above discussion particularly pertained to condensation type reactions and particularly to the popular polyurethane type cures. To illustrate the addition type of reaction, attention can be directed to polydiene systems such as natural rubber. It should be pointed out that the same type of material utilized in the condensation cures can also be vulcanized. For example, the carboxy terminated polybutadienes have the same polydiene structure as, for example, found in natural rubbers but is specifically synthesized to have terminal reactive groups. Natural rubbers, such as polyisoprene and synthetic high polymers, such as polybutadiene, have average molecular weights ranging into the hundreds of thousands whereas synthetic prepolymers such as the carboxy terminated polybutadienes have much lower molecular weight in the range of 1,000 to 6,000. The polydienes can be cured by either sulphur vulcanization or free radical cross-linking. Though these are two chemically different approaches, the resulting products have many common characteristics. Suitable free radical initiators such as dicumyl peroxide and other free radical initiators are additionally contemplated. In both the sulphur and free radical cure systems, control over cross-linking is achieved by progressively lowering either the sulphur or free radical initiator or by using a chain stopper. Another method contemplated for cross-linking diene long chain polymers is radiation. Control of cross-linking density in this case is achieved by dose limitation. Radiation can be used also to cross-link saturated long chain polymers as well as dienes. Examples of such polymers susceptible to radiation cross-linking include but are not limited to polyethylene, ethylene propylene rubber and poly alkylene oxide, such as polyethylene oxide.

Polymerization can either occur in bulk, depending upon the materials utilized, or it can be carried out in the presence of solvents. Once solvent polymerization is carried out, one can then subject the formed cross-linking material to an additional extraction/drying step. This step serves to particularly increase the absorption capacity of the polymer. Since this is an expensive step, for some applications it thus might not be warranted.

In addition to the utilization of a solvent in the polymerization, which appears to provide higher absorption characteristics, free radical initiated cross-linking can be carried out using emulsion and suspension polymerization techniques. Both of these techniques have been utilized for making highly cross-linked rubber materials for other end uses. However, for high oil absorption, cross-linking would be controlled, by methods cited above, to a low level. A particular advantage of emulsion or suspension polymerization is the ability to prepare a polymer in a desired particle size.

Absorption of oil is a slow diffusion process into the polymer material formed herein. Thus, it should be apparent that for most applications, the polymer product should have a high surface to thickness ratio. Such can be achieved by various mechanical techniques such as grinding, chopping, and other break-up methods, as well as casting of thin films. As indicated above, emulsion or suspension polymerization techniques can also be utilized to inherently form the polymeric material into fine or small particle sizes having a large surface area.

An additional way to increase the surface to thickness ratio of the polymer product of the invention would be to produce it in the form of an open cell foam. This is accomplished by the utilization of blowing agents during the polymerization in a manner that is well known to create a polymer foam. In urethane type cures, the introduction of either water or carboxylic acid will make the system self-foaming. With polydienes, it is known that free radical initiators having azo structures also serve as blowing agents.

It has been found that when the polymers of the invention, particularly the urethane type polymers are swollen with oil solute, they become very physically weak. For some applications, this is of no moment. For other applications, such as an oil slick clean up, it could present a problem. This could be overcome, however, by depositing the polymer onto a fiber substrate for example a mop could be constructed for oil slick clean up that could be made of long strings of fiber coated with the polymer. The fibers can be in the form of individual strands or actual pieces of fabric. Virtually any substrate material can be utilized which will not be effected by the oil yet is capable of supporting the cross-linked polymer product of this invention. With high absorption capacity as a goal, very low cross-linking alone is not sufficient. The solute or oil and the polymer must have good mutual solubility for compatibility. This has to do with the structure. For example, hydrocarbon polymers will have a high affinity for hydrocarbon oils but not for water. On the other hand, polyethylene oxide polymers will do well with water but not with hydrocarbon oils. This has to do with the chain material and is independent of the cross-linking method. Qualitatively, chain structure of both oil and polymer should be similar. These are semi-quantitative indexes which can be used to help choose which one to use such as "cohesive energy density" and "solubility parameter".

It can be seen from the aforegoing discussion that the herein invention does not inherently involve new techniques of forming cross-linked polymeric networks. The novelty of the invention is related particularly to forming polymers having an extremely low cross-linked density or a minimum of cross-linking. Prior to the herein invention, such materials were in fact not found to be desirable and no need existed for these types of polymers. It is believed that the novelty of the herein invention particularly resides in a recognition of utilization for this type of material for oil and fat absorption and the creation of such materials to achieve the absorption end results desired.

The specific examples which follow are illustrative of general types of polymer chain structures utilized to demonstrate this invention. The following types of polymer chains are not to be understood as limiting the invention, but are particularly illustrative of typical categories of polymers that can be utilized.

EXAMPLE 1

In this example, a polymer was prepared utilizing a liquid hydroxyl terminated polybutadiene prepolymer known as R-45 made by Arco which has a functionality of about three, having an equivalent weight of about 1250, together with a saturated polybutadiene which was Telagen-S made by General Tire, and is a hydrogenated hydroxyl terminated polybutadiene having secondary hydroxyl end groups, a hydroxyl value of 0.90 meg/gm and a molecular weight before hydrogenation of about 1960. The trifunctional R-45 thus allowed a cross-linking network to be achieved through the utilization of a diisocyanate which in this example was toluene diisocyanate, TDI. As a result, 25.33 grams of R-45; 21.74 grams of Telagen-S and 2.925 grams of TDI were mixed together. Added to the mixture was 0.05 grams of ferric acetyl acetonate (FEAA) as a polymerization catalyst. The reaction was carried out in 50 grams of xylene as a solvent. The cure conditions were 120° F for twenty-four hours. Benzene was utilized for a solvent in the extraction step to remove from the cured product all of the sol fraction present in the formed cross-linked material but not attached to the network. The remaining solid was then dried and weighed and is referred to hereinafter as the gel. The ratio of sol removed to the remaining gel in this example was 4.46. When the product was placed in oleic acid, the ratio of solute absorbed to dry polymer was 12.07 a swelling ratio of 13.01 to 1.0. In order to obtain a better concept as to the low cross-linking density, it should be pointed out that in order to have achieved a fully cross-linked material based upon the amount of reactive sites present 3.60 grams of TDI could have been utilized.

EXAMPLE 2

The same ingredients present in Example 1 were utilized. However, the reaction was carried out in the presence of mineral oil rather than xylene. The polymer was formed from 25.6 grams of R-45; 21.97 grams of Telagen-S; 2.43 grams of TDI, and .050 grams of FEAA mixed into 50 grams of mineral oil. The mixture was cured in 160° F for 72 hours. A solvent extraction was carried out utilizing benzene. The sol:gel ratio obtained was 49.54. In the absorption test for the dried material, oleic acid was utilized as a solute. The weight ratio of the solute absorbed to the dry polymer material was 25.81.

EXAMPLE 3

In this example, a polypropylene glycol was utilized as a basic prepolymer material, and 1,2,6-hexane triol was a cross-linking agent. Thus, 44.71 grams of polypropylene glycol; 0.66 grams of the hexane triol; 4.63 grams of TDI; and .025 grams of FEAA was mixed together. The material was cured at 160° F for 72 hours. Solvent extraction was performed on the resulting material utilizing benzene. The sol/gel ratio resulting from the solvent extraction was 1.33. The absorption test on the dry polymer was performed using oleic acid as the solute. The weight ratio of solute absorbed to the dry polymer formed herein was 17.81. The herein material was also tested prior to the solvent extraction. The absorption ratio of oleic acid to the polymer in this case was 3.55.

EXAMPLE 4

In this example, a rubber cement consisting of six percent natural rubber dissolved in benzene was utilized as a basic prepolymer material. This material is known as Goodrich No. 4 made by the B. F. Goodrich Company. 100 grams of the rubber cement was mixed with 0.60 grams of powdered zinc oxide which serves as filler and 0.12 grams of stearic acid which is conventionally used in rubber compounding. A sulphur vulcanization was utilized. Thus 0.18 gram of sulphur was added to the mixture together with 0.06 gram of diphenyl quanidine. The above composition is a standard rubber formulation with the amount of sulfur used being significantly reduced to achieve the desired low cross-linking. The mixed material was cured at 160° F for 72 hours. A solvent extraction was performed on the resulting material utilizing benzene. The sol/gel ratio obtained was 0.37. Two absorption tests were performed. The first utilized Wesson Oil, a soybean based vegatable oil made by Hunt-Wesson Foods, Inc. Company. The weight ratio of solute absorbed to dry polymer for the Wesson oil was 16.00. The absorption test was also performed with mineral oil and a weight ratio of mineral oil solute absorbed to dry polymer for this material was 23.28. If the resulting polymer was not subjected to the extraction/drying, the ratio of mineral oil absorbed to polymer would be 16.99.

It is to be realized that only preferred embodiments of the invention have been described and that numerous substitutions, modifications and alterations are permissible without departing from the spirit and scope of the invention as defined in the following claims.

What is claimed is:

1. A method of absorbing an oil selected from a hydrocarbon oil and a fatty acid oil comprising the steps of:

forming a lightly cross-linked highly swellable, solid, network polymer having an amount of cross-linking such that the polymer will exhibit an absorption characteristic by weight in said oil of at least 900 weight percent of said oil absorbed based on dry weight of the gel fraction of polymer formed by reacting a difunctional hydroxyl-terminated liquid prepolymer having a molecular weight of 1,000 to 6,000, a difunctional isocyanate curing agent in an amount less than that required to react with available hydroxyl groups so as not to form a fully cross-linked polymer, and an at least trifunctional hydroxyl-substituted cross-linking agent in a minimum amount necessary to form a solid, highly swellable polymeric product having a mean chain length between cross-linking sites of at least 4,000 chain atoms and said absorption characteristic;

extracting the soluble portion from the cross-linked portion of said polymer product; and adding said cross-linked polymer portion to said oil and swelling said portion and absorbing said oil therein in an amount of at least 10 times the weight of said cross-linked portion.

2. A method according to claim 1 in which said cross-linked network polymer has said absorption characteristic in oleic acid of at least 2,000 weight percent of oleic acid absorbed based on gel fraction of dry polymer.

3. A method according to claim 1 in which said prepolymer is hydroxy terminated material selected from unsaturated hydrocarbons, saturated hydrocarbons and polyethers.

4. A method according to claim 1 in which the ratio of NCO to total OH is from 0.5 to 0.85.

5. A method according to claim 4 in which the amount of cross-linking OH is from 5 to 25% of total OH.

6. A method according to claim 1 in which the diisocyanate is selected from toluene diisocyanate, dimer acid diisocyanate, hexamethylene diisocyanate and 4,4'-methylene di-o-tolylisocyanate.

7. A method according to claim 6 in which the prepolymer is a polybutadiene, the diisocyanate is toluene diisocyanate and the triol is selected from a trihydroxy substituted liquid polybutadiene and hexane triol.

8. A method according to claim 7 in which the polymer is formed from a reaction mixture containing in relative proportions, of about 25.6 grams of a trihydroxy substituted polybutadiene, 21.97 grams of dihydroxy polybutadiene and 2.43 grams of toluene diisocyanate and exhibits a weight ratio of absorbed oleic acid to dry polymer of about 25.81.

9. A lightly cross-linked, solid, network polymer highly swellable in hydrocarbon oil comprising the cross-linked, sol-extracted, urethane reaction product of:
    a dihydroxy terminated liquid prepolymer having a molecular weight from 1,000 to 6,000;
    a diisocyanate curing agent in an amount less than that required to react with available hydroxyl groups so as not to form a fully cross-linked polymer, the ratio of NCO to total OH being from 0.5 to 0.85; and
    a triol cross-linking agent in a minimum amount necessary to form a solid, highly swellable polymer having a mean chain length between cross-linking sites of at least 4,000 chain atoms and exhibiting an absorption of at least 900 weight percent of hydrocarbon oil based on gel fraction of dry polymer, the amount of cross-linking OH being from 5 to 25% of the total OH.

10. A polymer according to claim 9 in which the absorption characteristic in oleic acid is at least 2,000 weight percent of oleic acid absorbed based on gel fraction of dry polymer.

11. A polymer according to claim 10 in which the prepolymer is a hydroxy terminated material selected from unsaturated hydrocarbon, saturated hydrocarbon and polyether.

12. A polymer according to claim 11 in which the prepolymer is a polybutadiene.

13. A polymer according to claim 12 in which the diisocyanate is selected from toluene diisocyanate, dimer acid diisocyante, hexamethylene diisocyanate and 4,4'-methylene di-o-tolyisocyanate.

14. A polymer according to claim 13 in which the prepolymer is a polybutadiene, the diisocyante is toluene diisocyanate and the tiol is selected from a trihydroxy substituted liquid polybutadiene and hexane triol.

15. A polymer according to claim 14 in which the polymer is formed from a reaction mixture containing in relative proportions, of about 25.6 grams of a trihydroxy substituted polybutadiene, 21.97 grams of dihydroxy polybutadiene and 2.43 grams of toluene diisocyanate and exhibits a weight ratio of absorbed oleic acid to dry polymer of about 25.81.

* * * * *